(12) United States Patent
Chien

(10) Patent No.: US 9,033,569 B2
(45) Date of Patent: May 19, 2015

(54) LAMP HOLDER HAS BUILT-IN NIGHT LIGHT

(76) Inventor: Tseng-Lu Chien, Walnut, CA (US)

( * ) Notice: Subject to any disclaimer, the term of this patent is extended or adjusted under 35 U.S.C. 154(b) by 440 days.

(21) Appl. No.: 12/951,501

(22) Filed: Nov. 22, 2010

(65) Prior Publication Data

US 2012/0127692 A1 May 24, 2012

(51) Int. Cl.
*F21V 23/04* (2006.01)
*H05B 37/02* (2006.01)
*F21V 19/00* (2006.01)

(52) U.S. Cl.
CPC ........ *H05B 37/0245* (2013.01); *H05B 37/0218* (2013.01); *H05B 37/0236* (2013.01); *F21V 19/00* (2013.01); *Y02B 20/42* (2013.01)

(58) Field of Classification Search
CPC .......................................... F21V 9/16

USPC .......................................... 362/640–642, 276
See application file for complete search history.

(56) References Cited

U.S. PATENT DOCUMENTS

| | | | | |
|---|---|---|---|---|
| 4,303,032 A * | 12/1981 | Takahashi et al. | ................. | 413/1 |
| 5,428,515 A * | 6/1995 | Jung | ............................ | 362/640 |
| 6,322,228 B1 * | 11/2001 | Feldman | ......................... | 362/84 |
| 7,186,016 B2 * | 3/2007 | Jao | ................................ | 362/644 |
| 7,303,327 B2 * | 12/2007 | Copeland et al. | ............. | 362/640 |
| 7,520,635 B2 * | 4/2009 | Wolf et al. | .................... | 362/276 |
| 2005/0057927 A1 * | 3/2005 | Nakamura | .................... | 362/226 |
| 2006/0146527 A1 * | 7/2006 | VanderSchuit | ............... | 362/228 |

* cited by examiner

*Primary Examiner* — Anabel Ton
(74) *Attorney, Agent, or Firm* — Bacon & Thomas, PLLC

(57) ABSTRACT

A lamp holder has a built-in night light. The lamp holder may be part of a light device that is assembled on a production line or may be purchased by people to add to an existing lighting devices lamp holder.

9 Claims, 11 Drawing Sheets

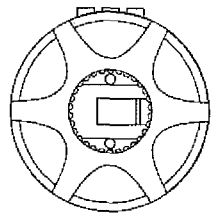
Fig 4E
BOTTOM VIEW
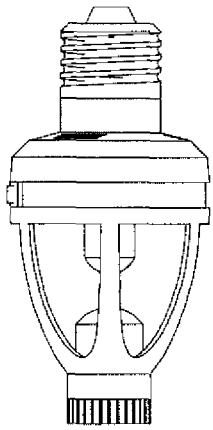
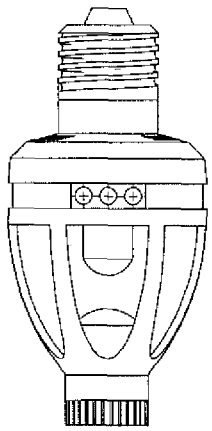
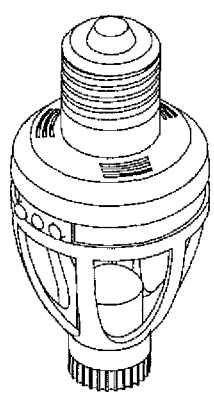
Fig 4C
Remote control unit has build in night light
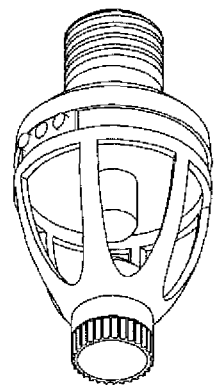
Fig 4A
Motion Sensor unit has build in night light
Fig 4B
Motion Sensor unit has brightness, sensitivity, time delay, photo sensitivity adjustable knob to adjust of value and setting.
Fig 4D
Remote control can be selected IR, PIR, RF for all kind of wireless control unit with build in night light.
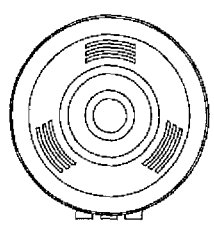
Fig 4F
TOP VIEW

LAMP HOLDER HAS BUILT-IN NIGHT LIGHT

BACKGROUND OF THE INVENTION

This application has subject matter in common with the inventor's 55 prior patent applications: U.S. patent application Ser. Nos. 10/341,519, 10/883,719, 10/883,747, 10/902,123, 10/954,189, 11/092,741, 11/092,742, 11/094,155. 11/094,156, 11/094,215, 11/152,063, 11/184,771, 11/255,981, 11/498,874, 11/498,881, 11/527,628, 11/527,629, 11/566,322, 11/806,284, 11/806,285, 12/003,691, 12/003,809, 12/007,076, 12/073,095, 12/073,889, 12/149,963, 12/149,964, 12/232,035, 12/232,505, 12/292,153, 12/292,580, 12/318,470, 12/318,471, 12/318,473, 12/502,661, 12/527,628, 12/527,629, 12/527,631, 12/545,992, 12/566,322, 12/622.000, 12/622,100, 12/624,621, 12/710,561, 12/710,918, 12/711,456, 12/771,003, 12/806,711, 12/886,832, 12/887,700, 12/907,443, 12/914,584, 12/938,564, 12/938,628, and 12/938,798.

These prior applications apply optics theory to various lighting devices, including LED lights for outdoor or indoor applications, that are powered by alternating current (AC) or direct current (DC) supplied by an electric cord and plug for an outlet, a battery, a transformer, solar power source, or another power source to create a plurality of LED light beams and provide illumination for close areas, or remote areas, for example by projection means, and which may include more than one light source, more than one function, more than one optics means, and/or more than one projection means with super power saving circuit and cost saving concepts.

Lamp holders with motion sensor, photo sensor, remote control or built-in circuits for different light means are very common in the marketplace. However, only the inventor's U.S. Pat. No. 6,168,282 incorporates one or more electro-luminescent elements to act as light source for a multi-function lamp holder. As disclosed in U.S. Pat. No. 6,168,282, which was filed on Oct. 28, 1997, and issued on Jan. 2, 2001, the electro-luminescent elements work with the same power source as the existing lamp holder's power source, which is connected to a 120V AC outlet. For different countries, the outlet power will be different, such as 110V in Taiwan and 250V in China.

The electro-luminescent elements disclosed in U.S. Pat. No. 6,168,282 can connect with the 120V 60 Hz AC current directly to emit a dim light which is just enough for people to see surrounding things or objects but not enough to keep people awake or make it difficult to fall sleep. However, only a green color can be created from the 120V 60 Hz current. Other colored lights need to use an expensive transformer to drive the electro-luminescent elements by supplying a higher frequency of a thousand to tens of thousands of Hertz to attain sufficient brightness and different colors. Hence, electro-luminescent elements have limitations as to the market requirements.

Since the year 2000, so-called high power light emitting diodes (LEDs) have become available in more colors, including white or blue colored LEDs with desired brightness. Because of mass production for use in all kinds of light device, the drive circuit-means has already dropped to a certain acceptable cost range at this time. The current LED light has plenty of different colors, lower power consumption, miniature size, a long life time, a quality of light that is not affected by humidity, and easy installation, and thus the current invention selects the LED as the preferred light source from a variety of different market-available light sources.

The lamp holder of the current invention may take the form of a lamp holder for production line assembly to a light device or a lamp holder which is purchased by people to add to an existing lamp holder. In other words, the lamp holder may be part of an Original Equipment Manufacturer (OEM) light device or a product that a consumer may purchase from a store to add to their own existing lighting device's lamp holder application. It will be appreciated that all kinds of lamp holder with different light sources having all kinds of control means, circuit means, functions, features, performances, shape, or size may fall within the current invention's scope.

The lamp holder of the current invention has a built-in night light which offers LED night light functions, performance, effects, and features that are in addition to the original lamp holder's functions, performance, effects, and features.

The built-in night light of the lamp holder of the current invention can also incorporate another low power consumption light source such as a neon bulb or other light source and is not limited to an LED only. LEDs need a trigger current, which might require a special circuit to achieve, while other light sources such as neon bulbs do not need such expensive circuit means and therefore can be triggered with lower cost to meet market requirements. As a result, the build-in night light may include any kind of light source having night light functions, performance, features, or effects and that may be incorporated with circuit means and/or IC means to cause the night light to be turned on and off according to the predetermined functions performance, features, and effects. The at least one light source arranged on the lamp holder to offer night light functions, features, performance, or effects may incorporate any desired combination of circuit means, IC means, conductive means, receiving base, housing means, ventilation means, opening means, switch means, sensor means, wireless means, remote control means, optics means, shade means, light medium means, light transmitting means, translucent means, optics lens, contact means, trigger means, turn-on and turn-off means, different light sources, LED, neon bulb, fluorescent tube, cold cathode tube, neon light, joint means, lamp base, isolation means, conductive ends, manual switch, pull wire switch, twist switch, push on-off switch, slid switch, touch switch, conductive switch, or other electric parts and accessories to cause the night light to turn on and turn off with a pre-determined timing, duration, time delay, period of time for desired light brightness, color, color temperature, and direction to enable surrounding objects be seen by viewers in a dark environment.

In addition, the light source of the above-described built-in night light may have a wide variety of colors and brightnesses, and may be humidity resistant, non-bendable, inflexible, quiet, and low frequency. This is totally different than the electro-luminescent element of the Inventor's prior patent, cited above, because the electro-luminescent element is very sensitive to humidity, which can cause electrical short circuits that burn the material and cause burn-out marking such as black spots and even fire hazards if the lamination of the electroluminescent element is bad. Hence, the current invention does not use EL elements for the night light. While the electro-luminescent element is bendable or flexible, it cannot have color changing or brightness changing properties without adding an expensive inverter to change the AC current from low frequency 60 Hz to thousands of Hertz, which will result in a high frequency noise that drives animals including dogs and cats crazy or disturbs people's sleep. Furthermore, the conventional electro-luminescent element is made out of a plastic material that cannot overcome the heat created by the light source of the lamp holder and may cause melting problems. Other light sources, such as a neon bulb, LED, bulb, cold cathode light means, or fluorescent tube, are solid and not subject to damage from the heat emitted by the light source of the lamp holder.

The lamp holder with built-in night light can be connected with a power source to turn on the light source via control means, circuit means, IC means, remote control means, and motion sensor means that provide pre-determined function(s). such as a differ function, brightness adjustment, sensitivity adjustment, duration time adjustment, color selection, sensor sensitivity adjustment, timer adjustment, motion sensor angle adjustment, remote control distance or direction adjustment to meet consumer demand.

Figure 1A:
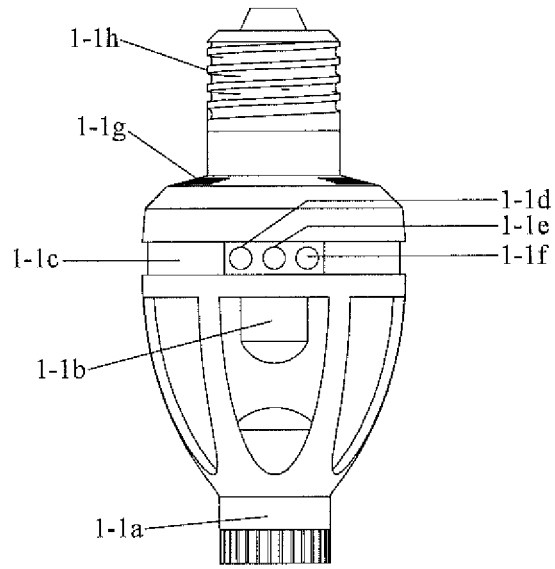
FIGS. 1A and 1B show a first preferred embodiment in the form of a motion sensor lamp holder having three adjustable switches to adjust photo sensor sensitivity, light turn-on duration, motion sensor sensitivity, color of the light, brightness of light, modes of the light source, a remote control system, light performance, or light functions and which may incorporate a desired combination of a variable switch, slide switch, dimmer switch, touch switch, toggle switch or any electric or mechanical switch for this kind of adjustable features.
Figure 1B:
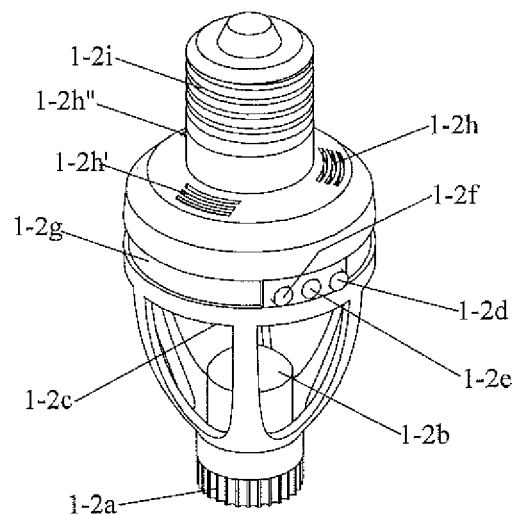

As illustrated, the motion sensor head of FIGS. 1A and 1B, includes a receiving base, a top housing, a night light location, optics means, a light medium, ventilation holes, and a lamp base.

Figure 2A:
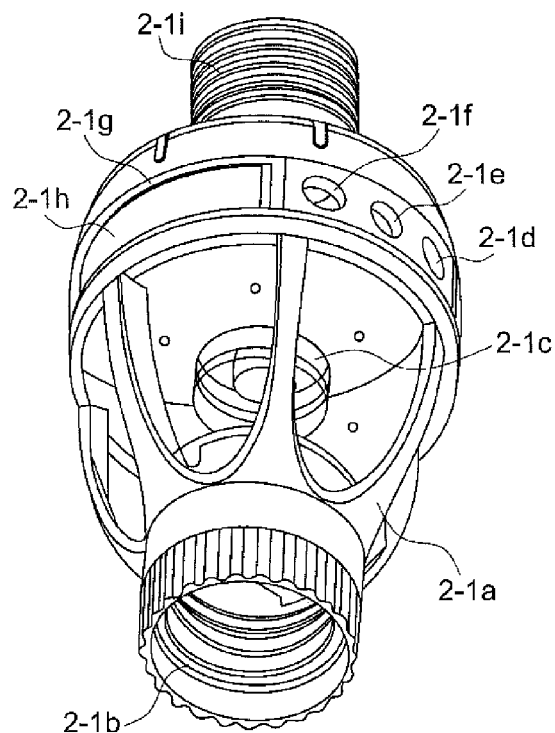
Figure 2B:
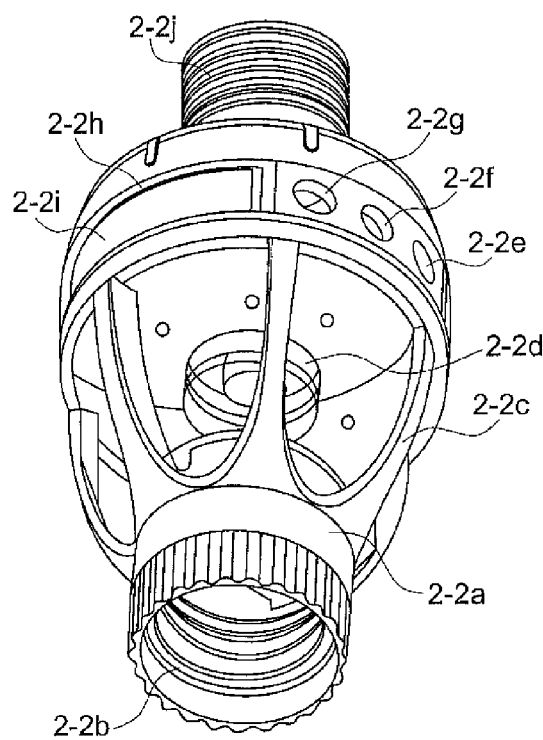

FIGS. 2A and 2B show other viewing angles for FIGS. 1A and 1B.

Figure 3:
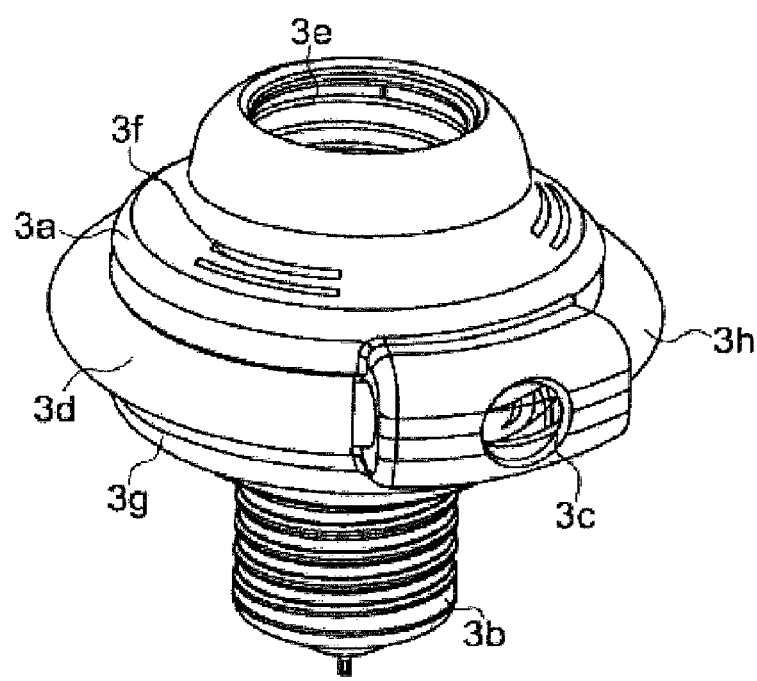

FIG. 3 shows a second preferred embodiment which may have a remote control means, wireless control means, pull string means, trigger means, slide switch means, twist switch means, motion sensor means, circuit means, IC chip means, and other related electric parts and accessories to turn on the desired light source for illumination according to pre-determined functions, colors, brightness, duration, time period, light performances, and effects.

FIGS. 4A, 4B, 4C, 4D, 4E, and 4F show variations of the first preferred embodiment with a different switch system, motion sensor, remote control or other electric control or manual controls to cause the said lamp holder to turn on and off the light source and provide desired functions.

Figure 5:
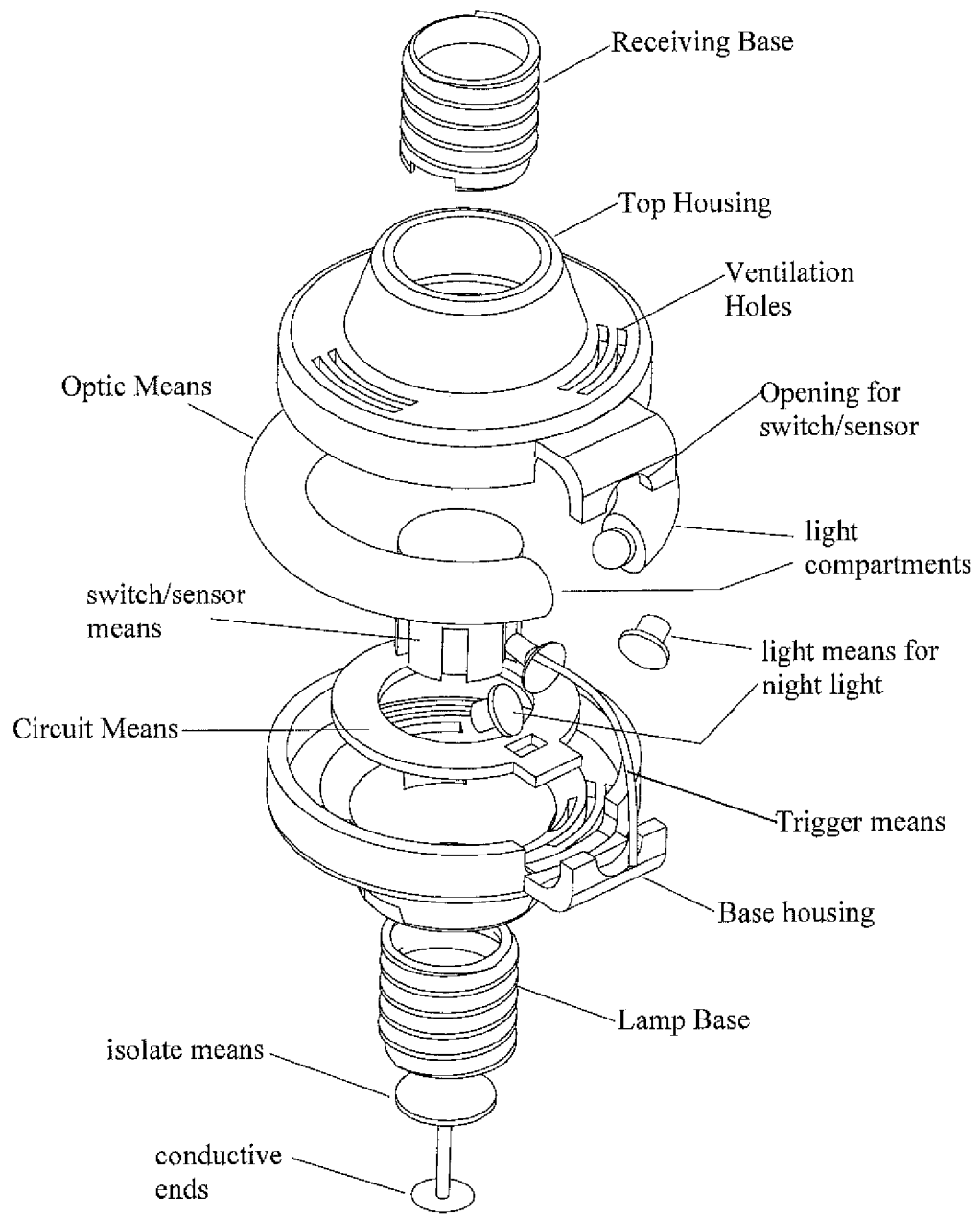
Figures 6A, 6B:
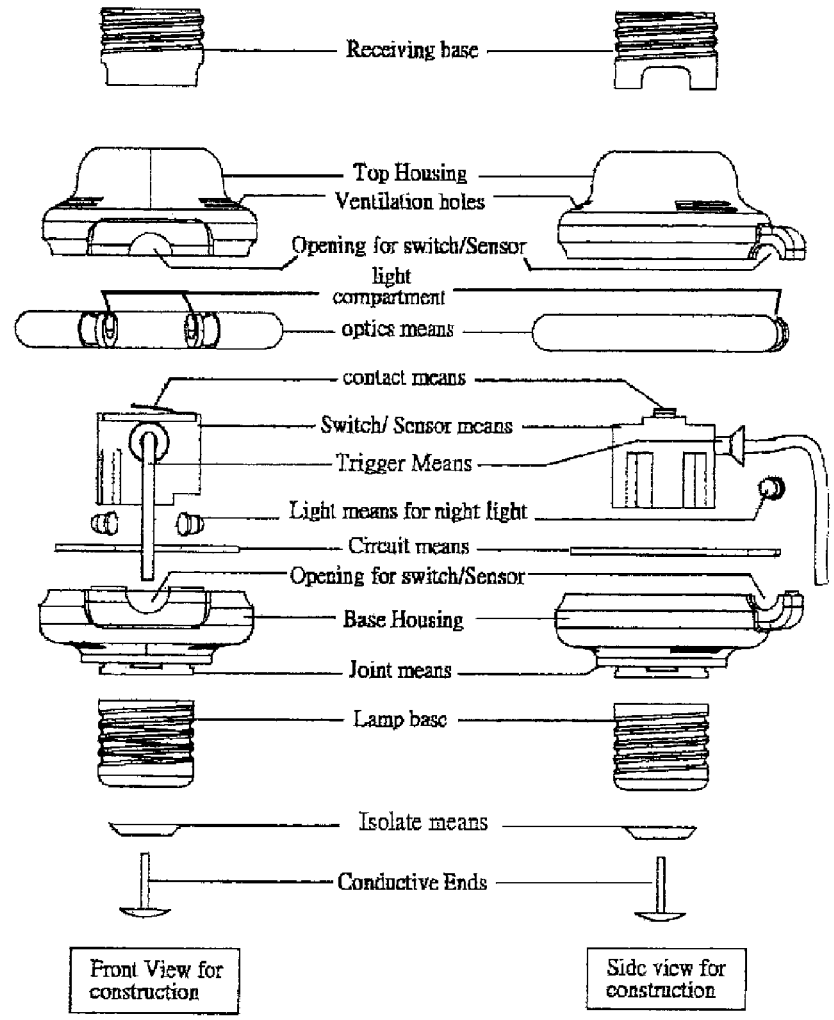
Figure 7:
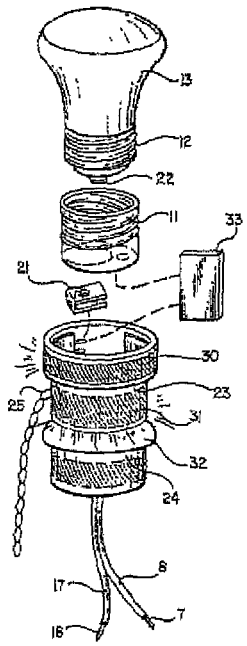
Figure 8:
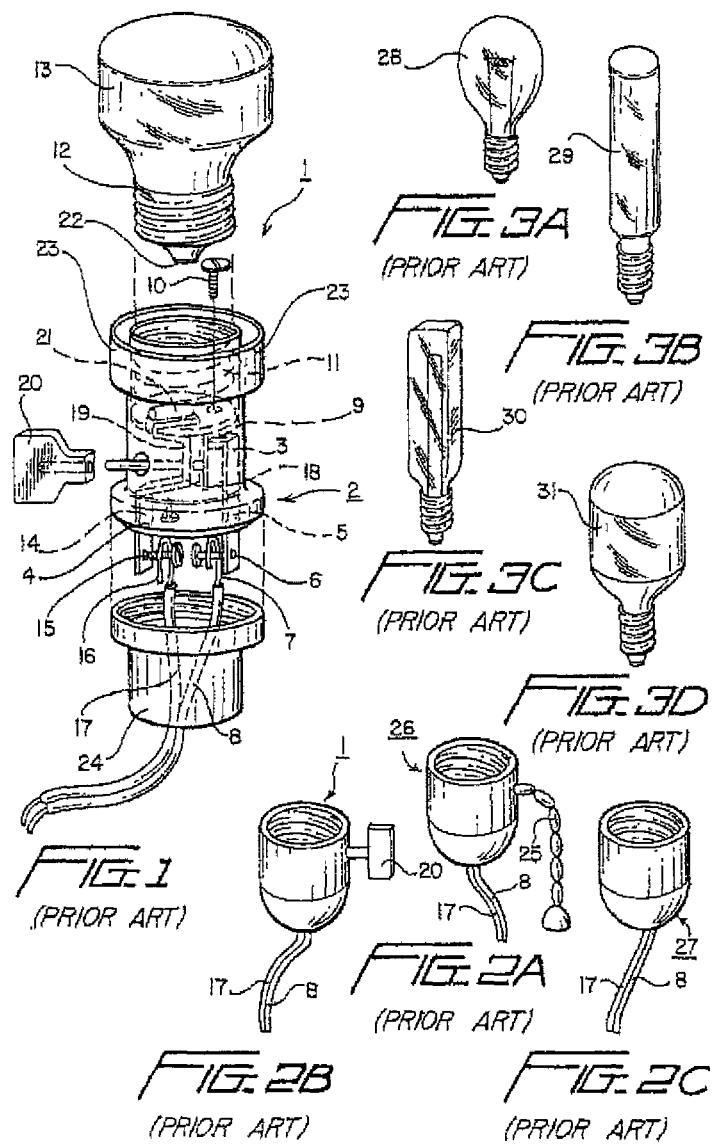
Figure 9:
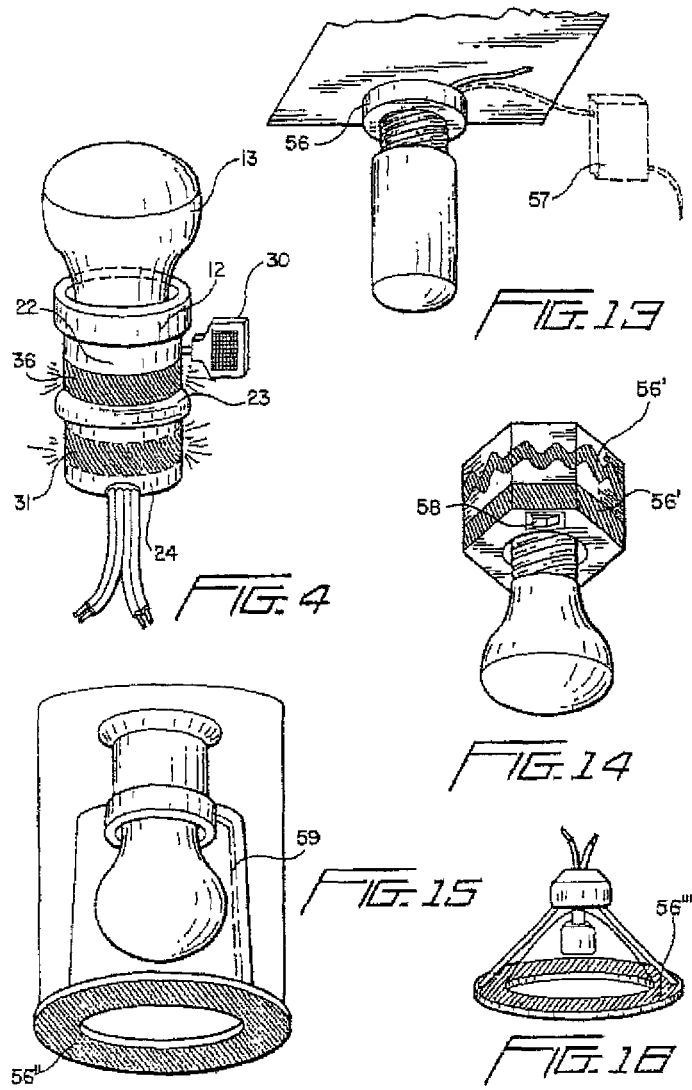
Figure 10:
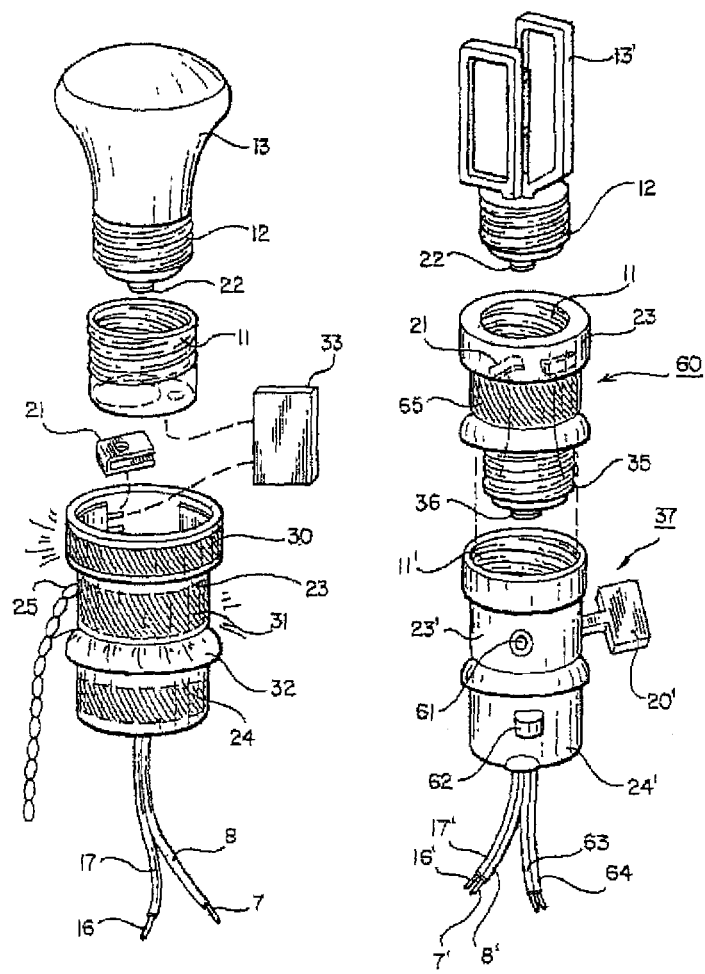
Figure 11:
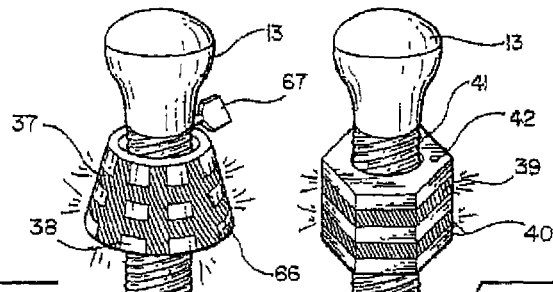
Figure 11:
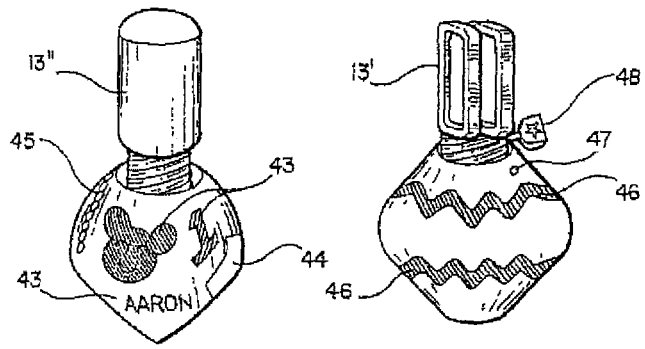
Figure 11:
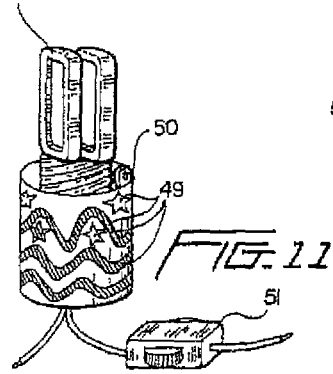
Figure 11:
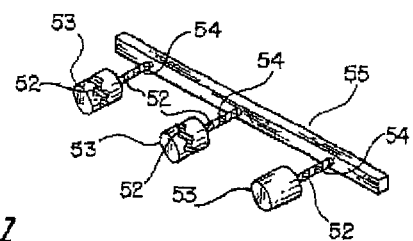

FIGS. 5, 6A and 6B show details of the first preferred embodiment.

FIGS. 7-11 of the drawings include illustrations from the inventor's prior U.S. Pat. No. 6,168,282, which show a lamp holder with a built-in night light in the form at least one electro-luminescent element.

DETAILED DESCRIPTION OF THE PREFERRED EMBODIMENTS

FIGS. 1A and 1B show a first preferred embodiment of a lamp holder with a built-in night light and a motion sensor (1-1b). The lamp holder has three adjustable switches (1-1d) (1-1e) (1-1f) to adjust the photo sensor sensitivity, the light turn on duration, the motion sensor sensitivity, the color of the light, the brightness of light, light source modes, a remote control system, light performance, or light functions, and which may incorporate any desired combination of a variable switch, slide switch, dimmer switch, touch switch, toggle switch, slide switch, or any electric or mechanical switch for this kind of adjustable features.

FIGS. 1A and 1B show that the first preferred embodiment has a motion sensor head (1-1b) (1-2c), three adjustable switches (1-1d)(1-1e) (1-1f0 (1-2d) (1-2e) (1-2f), a receiving base (1-1a) (1-2a), a top housing, a night light location (1-1c) (1-2g), optics means (not shown), a light medium (not shown), ventilation holes (1-1g) (1-2h) (1-2h') (1-2h"), a lamp base (1-1h) (1-2i). Additional details of parts and accessories included in the lamp holder are shown in FIGS. 5 and 6.

FIGS. 2A and 2BG show other viewing angles for FIGS. 1-1 and 1-2 with brief a description of an alternative but equivalent arrangement to provide the lamp holder with a perfectly built-in night light for any market-available application.

FIG. 3 shows a second preferred embodiment of a lamp holder having a built-in night light, which may have remote control means, wireless control means, pull string means, trigger means, slide switch means, twist switch means, motion sensor means, circuit means, IC chip means, and other related electric parts and accessories to turn on the desired light source for illumination according to pre-determined functions, colors, brightness, duration, time period, light performances, or effects. The electric parts and accessories are all arranged in a compartment (3c) and enable any kind of light source base (not shown) to be inserted into the receiving base (3e) to connect with inner circuit means and control means in the above-listed combinations and provide desired functions as described above. The light medium (3d) or optics means (3h) ensure that the said night light's light source provides a perfect light output to viewers. The light medium or optics means can include a bubble ring, air bubble ring, reflective ring, concave lens ring, convex lens ring, or any other optics means available from the marketplace to enhance the night light's light source and provide visible improvement in light performances. The compartment (3c) also offers an opening to install a switch means to allow people to operate its functions.

FIGS. 4A, 4B, 4C, 4D, 4E and 4F show variations of the first preferred embodiment with a different switch system and motion sensor, remote control or other electric control or manual controls to enable the lamp holder to turn on and off the light source according to desired functions. FIG. 4A shows a motion sensor unit having a built-in night light. FIG. 4B shows three adjustable switches to allow people to set their requirement. FIG. 4C shows a remote control or wireless control lamp holder having a built-in night light that can utilize a variety of light sources. As shown in FIG. 4D, the lamp holder can use a desired wireless design to meet different requirements.

FIGS. 4E and 4F are respective bottom top views of the lamp holder design of this preferred embodiment.

FIGS. 5 and 6 show further details and parts of the first preferred embodiment.

FIGS. 7-11 show the inventor's prior art, which incorporates flexible, bendable, humidity-sensitive, single color, and single brightness electro-luminescent element light means for lamp holder. The current invention uses light sources other than electro-luminescent elements and having different light functions, circuit means, optics means, light media, construction, assembly design, variety of color selection, and variety of brightness outputs from a single light source, so as to increase the features of the night light, which can be added onto any existing lamp holder that does not have a built-in night light. The electro-luminescent elements shown on pages 7-11 of the drawings are made out by plastic material which cannot overcome the heat created by a light source in the lamp holder and therefore may be subject to a melting problem. Other light sources such as a neon bulb, LED, bulb, cold cathode light means, fluorescent tube or any light source from the conventional marketplace that is solid can overcome the heat from the light source of lamp holder.

It is to be appreciated that the above discussion, drawings, and illustrations are not limiting, and that feature variations shown in the inventor's prior applications as well as other alternatives with the same or equivalent function may still fall within the current invention scope.

The invention claimed is:

1. A lamp holder for receiving a lighting element of a lamp, including:
   a lamp holder base for supplying electricity to the lamp holder;
   a socket for removably receiving a lighting element base, and for supplying electricity to the lighting element through the lighting element base; and
   a night light having a light source built into the lamp holder, said light source being in addition to any lighting element received in said socket, and said lamp holder further including circuitry, conductors, a housing, and controller means for causing said light source to turn on and off according to at least one of a predetermined timing, duration, time delay, brightness, color, color temperature, and lighting direction in order to provide a desired night light function, said controller means including at least one of an integrated circuit (IC), switch, sensor, and wireless or remote control circuit,
   wherein said lamp holder may be assembled to the lighting element by a manufacturer to form a lighting device or sold to consumers so that the consumers may assemble the lamp holder to an existing lighting device,
   wherein said light source is a non-bendable, inflexible, humidity-resistant, low noise, low frequency light source, and
   wherein said light source is supplied with electricity from said lamp holder base under control of the controller means and at least one of the IC, switch, sensor, and wireless or remote control circuit.

2. A lamp holder as claimed in claim 1, wherein said light source is an LED.

3. A lamp holder as claimed in claim 1, wherein said light source is one of a neon bulb, fluorescent tube, cold cathode tube, and neon light.

4. A lamp holder as claimed in claim 1, wherein the controller means is one of an electrical and an electromechanical controller.

5. A lamp holder as claimed in claim 1, wherein said light source is heat resistant to prevent damage from heat emitted by the lighting element receiving in the lamp holder.

6. A lamp holder as claimed in claim 1, wherein the wireless or remote control circuit is an IR, PIR, RF, or Bluetooth control circuit.

7. A lamp holder as claimed in claim 1, wherein said switch is an electronic or mechanical switch.

8. A lamp holder as claimed in claim 1, wherein said night light further include optics means or a light medium for optically enhancing light emitted by the light source.

9. A lamp holder as claimed in claim 1, wherein the lamp holder base has a same configuration and dimensions as the lighting element base received in the socket.

* * * * *